(12) United States Patent
Holt et al.

(10) Patent No.: US 10,552,738 B2
(45) Date of Patent: Feb. 4, 2020

(54) ADAPTIVE CHANNEL CODING USING MACHINE-LEARNED MODELS

(71) Applicant: Google Inc., Mountain View, CA (US)

(72) Inventors: Jason E. Holt, Mountain View, CA (US); Marcello Herreshoff, Mountain View, CA (US)

(73) Assignee: Google LLC, Mountain View, CA (US)

( * ) Notice: Subject to any disclaimer, the term of this patent is extended or adjusted under 35 U.S.C. 154(b) by 512 days.

(21) Appl. No.: 15/380,399

(22) Filed: Dec. 15, 2016

(65) Prior Publication Data

US 2018/0174050 A1    Jun. 21, 2018

(51) Int. Cl.
*G06N 3/08* (2006.01)

(52) U.S. Cl.
CPC .................................. *G06N 3/084* (2013.01)

(58) Field of Classification Search
CPC ............................. G06N 3/084; G06N 3/0454
See application file for complete search history.

(56) References Cited

U.S. PATENT DOCUMENTS

| | | |
|---|---|---|
| 8,515,473 B2 | 8/2013 | Mody et al. |
| 2009/0047916 A1 | 2/2009 | Haykin |
| 2009/0124208 A1 | 5/2009 | Mody et al. |
| 2017/0169357 A1* | 6/2017 | Caspi ................... H04B 1/3822 |

OTHER PUBLICATIONS

Wang et al, Sequential Neural Network Model, 1994, IEEE (Year: 1994).*
Abbas et al., "Recent Advances on Artificial Intelligence and Learning Techniques in Cognitive Radice Networks", EURASIP Journal on Wireless Communications and Networking, (2015) 2015:174, 20 pages.
Clancy et al., "Applications of Machine Learning to Cognitive Radio Networks" IEEE Wireless Communications, vol. 14, Issue 4, Aug. 2007, pp. 47-52.
Masci et al., "Stacked Convolutional Auto-Encoders for Hierarchical Feature Extraction", Artificial Neural Networks and Machine Learning—ICANN 2011, vol. 6791 of the series Lecture Notes in Computer Science, pp. 52-59.

(Continued)

*Primary Examiner* — Austin Hicks
(74) *Attorney, Agent, or Firm* — Dority & Manning, P.A.

(57) ABSTRACT

The present disclosure provides systems and methods that enable adaptive training of a channel coding model including an encoder model, a channel model positioned structurally after the encoder model, and a decoder model positioned structurally after the channel model. The channel model can have been trained to emulate a communication channel, for example, by training the channel model on example data that has been transmitted via the communication channel. The channel coding model can be trained on a loss function that describes a difference between input data input into the encoder model and output data received from the decoder model. In particular, such a loss function can be backpropagated through the decoder model while modifying the decoder model, backpropagated through the channel model while the channel model is held constant, and then backpropagated through the encoder model while modifying the encoder model.

20 Claims, 9 Drawing Sheets

(56) References Cited

OTHER PUBLICATIONS

O'Shea et al., "Convolutional Radio Modulation Recognition Networks", arXiv:1602-04105v3 [cs.LG] Jun. 10, 2016, 15 pages.
O'Shea et al., "Learning to Communicate: Channel Auto-Encoders, Domain Specific Regulathers, and Attention", arXiv:1608.06409v1 [cs.LG] Aug. 23, 2016, 11 pages.
O'Shea et al., "Unsupervised Representation Learning of Structured Radio Communication Signals", arXiv:1604.07078v1 [cs.LG] Apr. 24, 5 pages.
Qi et al., "Spectrum Environment Machine Learning in Cognitive Radio", Proeedia Engineering, vol. 29, 2012, pp. 4181-4185.
Roy et al., "Throughput Maximization in Cognitive Radio Networks using Levenberg-Marquardt Algorithm", International Journal of Advanced Research in Computer and Communication Engineering, vol. 4, Issue 2, Feb. 2015, pp. 315-319.
Tsagkaris et al., "Neural Network-Based Learning Schemes for Cognitive Radio Systems", Journal of Computer Commtmieations, vol. 31, Issue 14, Sep. 2008, pp. 3394-3404.
Weigand, "Convergence of Communication and Machine Learning" Keynote at ITU World Telecommunication Standarization Assembly, Oct. 26, 2016, 39 pages.
International Search Report for PCT/US2017/053943 dated Dec. 6, 2017, 12 pages.
Ghaffarzadegan et al., "Generative Modeling of Pseudo-Whisper for Robust Whispered Speech Recognition", Institute of Electrical and Electronics Engineers Transactions on Audio, speech, and Language Proceeding, vol. 24, No, 10, Oct. 2016, pp. 1705-1720.
O'Shea et al., "Learning to Communicate: Channel Auto-encoders, Domain Specific Regularizers, and Attention," Aug. 23, 2016, arXiv:1608.06409v1, 10 pages.

\* cited by examiner

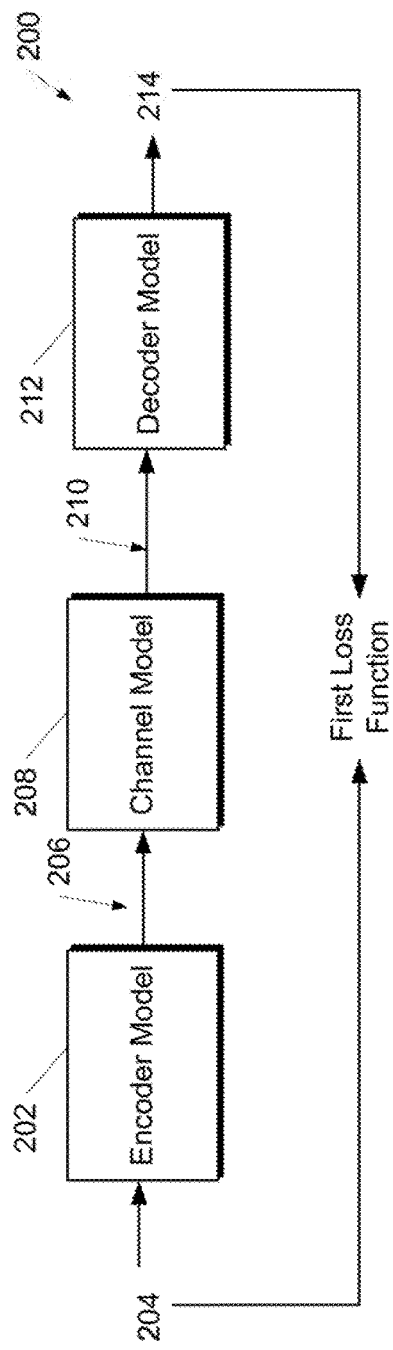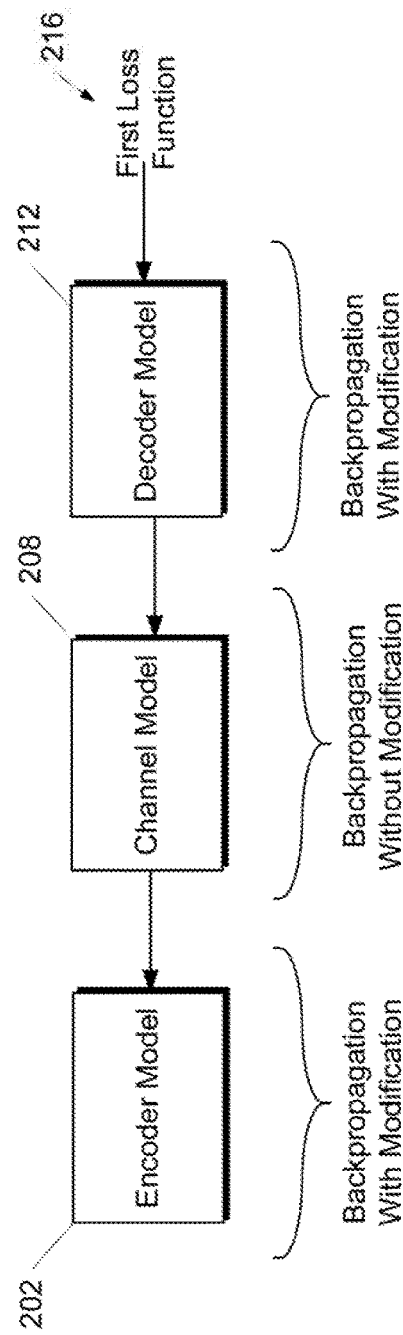
Figure 3
Figure 4

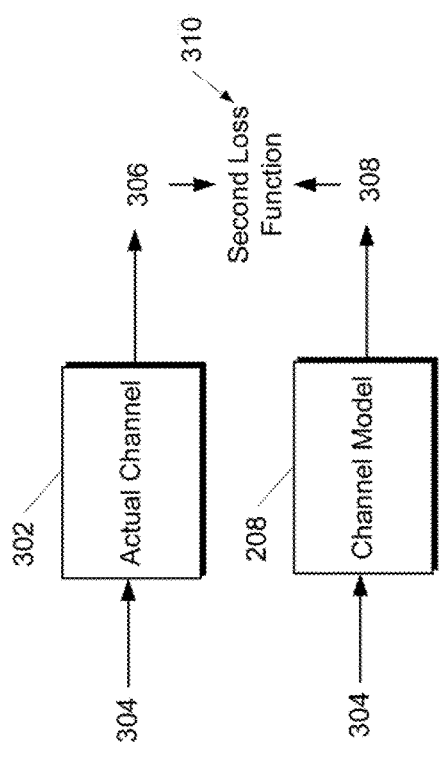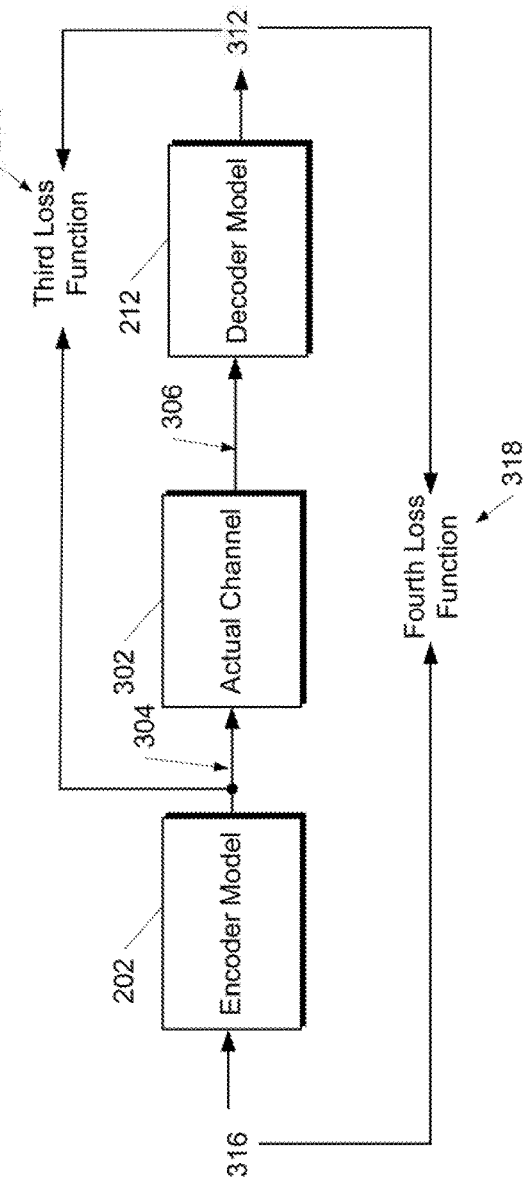

900

902 — Train a machine-learned decoder model by sequentially backpropagating a loss function through a decoder model to modify at least one weight of the decoder model, and then through a channel model without modifying the channel model, and then through the encoder model to modify at least one weight of the encoder model, the encoder model configured to receive a first set of inputs and output a first set of outputs, the channel model configured to receive the first set of outputs and output a second set of outputs, the decoder model configured to receive the second set of outputs and output a third set of outputs, the loss function descriptive of a difference between the first set of inputs and the third set of outputs 904 — Obtain a first set of communication data received from a communication channel (e.g., a transmitted encoded version of transmit data)

906 — Input the first set of communication data into the machine-learned decoder model 908 — Receive as an output of the machine-learned decoder model a decoded version of the communication data 910 — Provide the decoded version of the communication data to one or more computing devices or components thereof

Figure 13

ADAPTIVE CHANNEL CODING USING MACHINE-LEARNED MODELS

FIELD

The present disclosure relates generally to machine learning. More particularly, the present disclosure relates to systems and methods for implementing adaptive channel coding using machine-learned models.

BACKGROUND

Machine learning generally refers to a field of computer science that is focused on enabling machines such as computers to learn without being explicitly programmed. Machine learning includes the study and construction of machine-performed algorithms or techniques that enable machines to learn from and make predictions on data. In particular, such algorithms can operate by building a model from a training set of input observations in order to make data-driven predictions or decisions expressed as outputs, rather than following strictly static programming instructions.

One main branch of machine learning techniques includes supervised learning techniques. Supervised learning can include inferring or learning a function or model from a training data set that includes a number of labeled examples. For example, each example in the training data set can include one or more input values (which can be expressed as a vector with a number of features) and one or more desired output values (which can also be called supervisory signals). Typically, training data is labeled using known ground truth information that provides the input values and the output values. A supervised machine learning algorithm can analyze the training data and produce an inferred model, which can then be used for mapping or making predictions on new, unlabeled examples. However, in many scenarios, labeled data and/or ground truth data can be difficult and/or costly to obtain. This can be the case for a machine-learned model of a communication channel, which is often subject to changing channel conditions. Thus, performing supervised learning in such scenarios can be difficult or impossible.

SUMMARY

Aspects and advantages of embodiments of the present disclosure will be set forth in part in the following description, or can be learned from the description, or can be learned through practice of the embodiments.

One example aspect of the present disclosure is directed to a computing system to perform machine learning. The computing system includes at least one processor and at least one tangible, non-transitory computer-readable medium that stores instructions that, when executed by the at least one processor, cause the computing system to obtain data descriptive of a model that comprises an encoder model, a channel model and a decoder model. The encoder model is configured to receive a first set of inputs and, in response to receipt of the first set of inputs, generate a first set of outputs. The channel model is configured to receive the first set of outputs and, in response to receipt of the first set of outputs, generate a second set of outputs. The decoder model is configured to receive the second set of outputs and, in response to receipt of the second set of outputs, generate a third set of outputs. The instructions further cause the computing system to determine a first loss function that describes a difference between the first set of inputs and the third set of outputs. The instructions further cause the computing system to backpropagate the first loss function through the decoder model while modifying the decoder model to train the decoder model. The instructions further cause the computing system to after backpropagating the first loss function through the decoder model, continue to backpropagate the first loss function through the channel model without modifying the channel model. The instructions further cause the computing system to after backpropagating the first loss function through the channel model, continue to backpropagate the first loss function through the encoder model while modifying the encoder model to train the encoder model.

Another example aspect of the present disclosure is directed to a computing device that determines an encoding scheme for a communication channel. The computing device includes at least one processor. The computing device also includes a machine-learned encoder model that is configured to receive a first set of inputs and output a first set of outputs, the encoder model having been trained by sequentially backpropagating a loss function through a decoder model to modify at least one weight of the decoder model, and then through a channel model without modifying the channel model, and then through the encoder model to modify at least one weight of the encoder model. The channel model can have been configured to receive the first set of outputs and output a second set of outputs, the decoder model configured to receive the second set of outputs and output a third set of outputs, and the loss function descriptive of a difference between the first set of inputs and the third set of outputs. The computing device also includes at least one tangible, non-transitory computer-readable medium that stores instructions that, when executed by the at least one processor, cause the at least one processor to obtain a first set of transmit data for transmitting over a communication channel. The instructions can also cause the at least one processor to input the first set of transmit data into the machine-learned encoder model. The instructions can also cause the at least one processor to receive, as an output of the machine-learned channel encoder model, an encoded version of the transmit data. The instructions can also cause the at least one processor to transmit the encoded version of the transmit data over the communication channel.

Another example aspect of the present disclosure is directed to one or more tangible, non-transitory computer-readable media storing computer-readable instructions that when executed by one or more processors cause the one or more processors to perform operations. The operations include obtaining data descriptive of a machine-learned decoder model, the decoder model having been trained by sequentially backpropagating a loss function through the decoder model to train the decoder model, and then through a channel model without modifying the channel model, and then through an encoder model to train the encoder model, the encoder model configured to receive a first set of inputs and output a first set of outputs, the channel model configured to receive the first set of outputs and output a second set of outputs, the decoder model configured to receive the second set of outputs and output a third set of outputs, the loss function descriptive of a difference between the first set of inputs and the third set of outputs. The operations also include obtaining a first set of communication data received from a communication channel. The operations also include inputting the first set of communication data into the machine-learned decoder model. The operations also include receiving as an output of the machine-learned decoder model, in response to receipt of the first set of communication data, a decoded version of the communication data.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3 depicts a block diagram of a first aspect of an example model training technique according to example embodiments of the present disclosure;

FIG. 4 depicts a block diagram of a second aspect of an example model training technique according to example embodiments of the present disclosure;

FIG. 5 depicts a block diagram of a third aspect of an example model training technique according to example embodiments of the present disclosure;

FIG. 6 depicts a block diagram of a fourth aspect of an example model training technique according to example embodiments of the present disclosure;

FIG. 13 depicts a flow chart diagram of an example method of decoding communication data according to example embodiments of the present disclosure.

DETAILED DESCRIPTION

Figure 1:
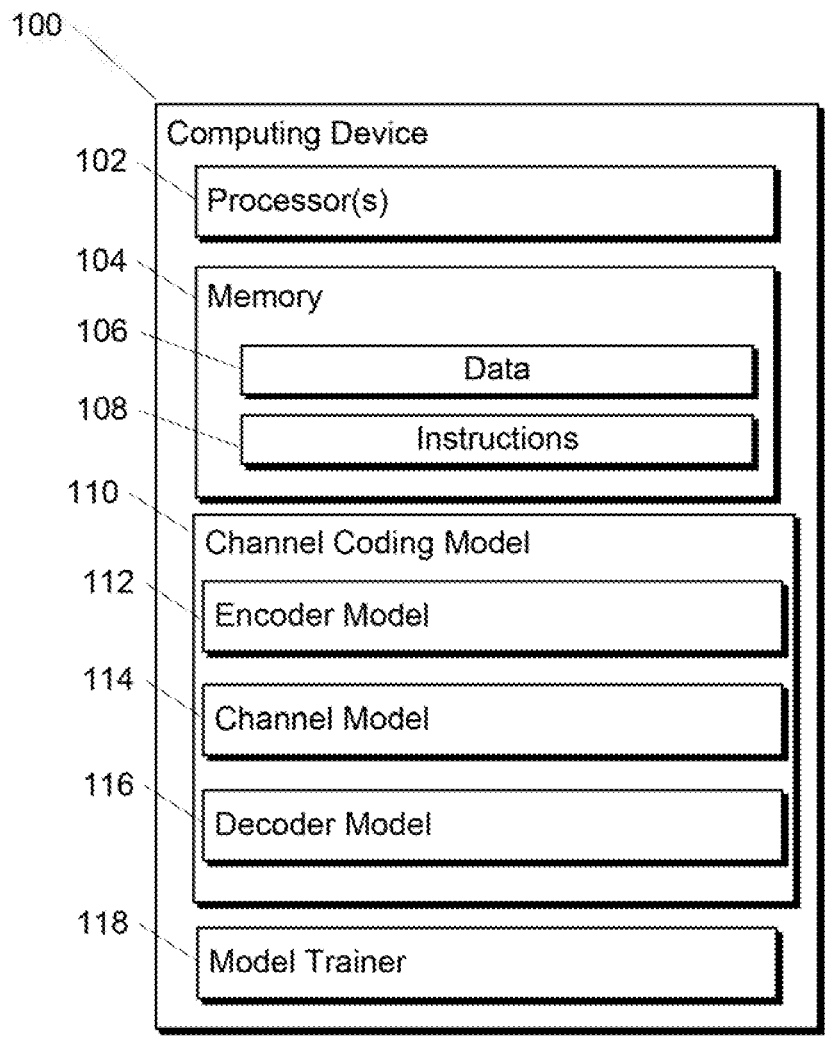
FIG. 1 depicts a block diagram of an example computing device according to example embodiments of the present disclosure.

The present disclosure provides a machine-learned channel coding model and associated training techniques that enable the channel coding model to generate a machine-learned encoding scheme for a communication channel. In one example, a machine-learned channel coding model can include an encoder model, a channel model positioned structurally after the encoder model, and a decoder model positioned structurally after the channel model. The channel model can have been trained to emulate a communication channel, for example, by training the channel model on example data that has been transmitted via the communication channel. According to an aspect of the present disclosure, the channel coding model can be trained on a loss function that describes a difference between input data input into the encoder model and output data received from the decoder model. In particular, in some implementations, such a loss function can be backpropagated through the decoder model while modifying the decoder model, backpropagated through the channel model while the channel model is held constant, and then backpropagated through the encoder model while modifying the encoder model. Backpropagating the loss function in such fashion enables modification of only the encoder model and the decoder model, but not the channel model, since the role of the channel model is to faithfully emulate the communication channel. By training the channel coding model in such fashion, the encoder model can learn how to encode input data for transmission over the communication channel and the decoder model can learn how to decode data coming out of the communication channel back into the original input data provided to the encoder model. Thus, the encoder model and the decoder model of the channel coding model can automatically devise an appropriate encoding scheme for the communication channel. As such, following training as described above, the encoder model and decoder model can be used to respectively encode data and decode data transmitted over the communication channel. For example, the encoder model can be implemented by a transmitter device or component to encode communication data prior to transmission of the communication data via the communication channel, while the decoder model can be implemented by a receiver device or component to decode the communication data received via the communication channel.

In addition, according to another aspect of the present disclosure, the channel coding model can be retrained in order to adapt the channel coding model and corresponding encoding scheme to changing conditions of a communication channel over time. For example, if the behavior of or conditions associated with the communication channel change over time, the channel model can be retrained (e.g., on data recently transmitted via the communication channel) to emulate the new behavior of the communication channel. The encoder model and decoder model portions of the channel coding model can then be retrained as described above using the updated channel model, thereby causing the encoder model and decoder model portions of the channel coding model to learn an updated encoding scheme that is appropriate for the new communication channel conditions. Furthermore, in some implementations, the above described retraining of the channel coding model can be performed in the field.

More particularly, according to an aspect of the present disclosure, an encoder model can be configured to receive a first set of inputs and, in response to receipt of the first set of inputs, generate a first set of outputs. The encoder model can be, for example, a neural network such as a deep neural network or other multi-layer non-linear model. In some implementations, the first set of inputs can be expressed according to a first set of dimensions and the first set of outputs can be expressed according to a second set of dimensions that are different than the first set of dimensions.

The second set of dimensions can include a relatively smaller number of dimensions that the first set of dimensions or vice versa. Further, in some implementations, the first set of inputs can include arbitrary, unlabeled, real-world data.

According to another aspect of the present disclosure, a channel model can be trained to emulate a communication channel. As such, the channel model can be configured to receive a set of inputs (e.g., the first set of outputs generated by the encoder model) and, in response to receipt of the first set of outputs, generate a second set of outputs. The channel model can be, for example, a neural network such as a deep neural network or other multi-layer non-linear model. In some implementations, the first set of outputs provided as input to the channel model can be expressed according to the second set of dimensions and the second set of outputs can be expressed according to the same second set of dimensions. In some examples, the channel model can be representative of a wireless channel (e.g., a radio frequency (RF) link). In some examples, the channel model can be representative of a wired channel (e.g., a data transmission link for relaying data in accordance with Ethernet, LVDS, I2C, or other data transmission protocols).

According to another aspect of the present disclosure, a decoder model can be configured to receive a set of inputs (e.g., the second set of outputs generated by the channel model) and, in response to receipt of the second set of outputs, generate a third set of outputs. The decoder model can be, for example, a neural network such as a deep neural network or other multi-layer non-linear model. In some implementations, the third set of outputs can be expressed according to the first set of dimensions. Thus, in some implementations, while the encoder model transforms data from the first set of dimensions to the second set of dimensions, the decoder model transforms data from the second set of dimensions back into the first set of dimensions. As such, the decoder model can be said to have performed an inverse transformation relative to the encoder model.

In this respect, the encoder model and decoder model of the present disclosure, when taken together, are in some respects similar to an autoencoder. For example, an autoencoder can typically include an encoder portion and a decoder portion with a relatively narrow connection of data transfer between the two portions. However, the disclosed channel coding model incorporates a third portion, namely a channel model, in between encoder and decoder portions. Providing a channel model between an encoder model and a decoder model provides an ability to model the addition of noise to an output of the encoder model, such as would be present in numerous applications when data is transmitted over a wired and/or wireless noisy communication channel before being received and evaluated by a decoder.

In one aspect of the present disclosure, training the channel coding model can include training the encoder model and decoder model when the channel model is structurally provided between the encoder model and decoder model. If the encoder model is configured to receive a first set of inputs, then the encoder model can generate a first set of outputs in response to receipt of the first set of inputs. The first set of outputs can be provided as input to the channel model, which then can generate a second set of outputs in response to receipt of the first set of outputs. The second set of outputs can be provided as input to the decoder model, which then can generate a third set of outputs in response to receipt of the second set of outputs. A first loss function can be determined that describes a difference between the first set of inputs and the third set of outputs. The first loss function can be backpropagated through the decoder model while modifying the decoder model to train the decoder model, for example, by modifying at least one weight associated with the decoder model. After backpropagating the first loss function through the decoder model, the first loss function can continue to be backpropagated through the channel model without modifying the channel model. After backpropagating the first loss function through the channel model, the first loss function can be backpropagated through the encoder model while modifying the encoder model to train the encoder model, for example, by modifying at least one weight associated with the encoder model. As such, both the encoder and decoder models can be trained relative to the inputs and outputs of the channel model.

In one aspect of the present disclosure, training the channel coding model can include training the channel model portion thereof. The channel model can be trained to emulate or behave like a communication channel. As such, a second set of inputs can be sent over an actual communication channel and a fourth set of outputs can be received from the communication channel in response to receipt of the second set of inputs. The channel model portion can be trained based at least in part from the second set of inputs to the communication channel and the fourth set of outputs received from the communication channel. In some examples, the fourth set of outputs from the communication channel can be compared to a fifth set of outputs output by the channel model in response to receipt of the second set of inputs to generate a loss function (e.g., a second loss function). The second loss function can be backpropagated through the channel model to train the channel model, for example, by modifying at least one weight associated with the channel model.

In another aspect of the present disclosure, training the channel coding model can include further training the decoder model portion thereof. In some implementations, in addition to the training described above that enables the decoder model to decode data coming out of the channel model, the decoder model can be further trained (e.g., before or after the training described above) to learn how to decode data coming out of the communication channel (e.g., the actual communication channel used to train the channel model).

More particularly, in some examples, the decoder model can be trained to decode data coming out of a communication channel back into the communication data provided as input to the communication channel. Consider the second set of inputs described above provided to a communication channel, from which a fourth set of outputs is received. The fourth set of outputs can be provided to the decoder model, which can generate a sixth set of outputs in response to receipt of the fourth set of outputs. In one example, the sixth set of outputs from the decoder model can be compared to the second set of inputs to the communication channel to determine a loss function (e.g., a third loss function). The third loss function can be backpropagated through the decoder model while modifying the decoder model to train the decoder model (e.g., by modifying one or more weights associated with the decoder model) to generate outputs that attempt to reconstruct the data provided to the communication channel.

More particularly, in other examples, the decoder model can be trained to decode data coming out of a communication channel back into an original set of input data that was encoded before being sent over a communication channel. For instance, consider that the second set of inputs to the communication channel corresponds to a set of outputs generated by an encoder model in response to receipt of a third set of inputs provided to the encoder model. In such instance, a fourth loss function can be determined that compares the sixth set of outputs from the decoder model to the third set of inputs provided to the encoder model. This fourth loss function can be backpropagated through the decoder model while modifying the decoder model (e.g., by modifying one or more weights associated with the decoder model) to train the decoder model to generate outputs that attempt to reconstruct the data provided to the encoder model.

After a channel coding model, including a decoder model, channel model and encoder model, has been trained in accordance with one or more of the disclosed machine learning techniques, the channel coding model or selected portions thereof can be employed to determine enhanced encoding and/or decoding schemes. In one example, a trained encoder model can be implemented by a transmitter device or component to encode communication data (e.g., transmit data) prior to transmission of the communication data via the communication channel. For instance, a first set of transmit data for transmitting over a communication channel can be obtained. The first set of transmit data can be provided as input to a trained machine-learned encoder model. An encoded version of the transmit data can be received as an output of the machine-learned trained encoder model in response to receipt of the transmit data. The encoded version of the transmit data then can be transmitted over the communication channel.

In another example, a trained decoder model can be implemented by a receiver device or component to decode communication data (e.g., a transmitted encoded version of transmit data) after receipt of the communication data from a communication channel. For instance, a transmitted encoded version of transmit data can correspond to the encoded version of the transmit data output from the encoder model that is subsequently transmitted over a communication channel. This transmitted encoded version of the transmit data can be received from the communication channel and provided as input to the trained machine-learned decoder model. A decoded version of the transmit data can be received as an output of the machine-learned trained decoder model in response to receipt of the transmitted encoded version of the transmit data received from the communication channel. In some examples, the decoder model is trained to attempt to reconstruct the original transmit data provided to an encoder model such that the decoded version of the transmit data is as close as possible to the original transmit data. The decoded version of the transmit data then can be provided to one or more computing devices or components thereof for further processing or provision as output data (e.g., via a display device and/or audio device).

The systems and methods described herein may provide a number of technical effects and benefits. For instance, machine-learned models can be employed to automatically devise improved channel-appropriate encodings for data transmission in a variety of applications. In some instances, enhanced encoding schemes can be determined for wireless communication applications. Additional and/or alternative coding parameters can be determined for applications including but not limited to data compression, cryptography, error-correction, networking and the like. Other data transmission applications can utilize wired links, for example, applications using specialized transmission protocols such as Ethernet, Low-Voltage Differential Signaling (LVDS), Inter-Integrated Circuit (I2C) and other data coding techniques. Encoding schemes can be customized for particular applications in order to correct and/or detect errors in transmit data.

The systems and methods described herein may also provide a technical effect and benefit of providing features for dynamically determining enhanced encoding schemes, especially compared with some conventional techniques that involve manually devising an encoding. The disclosed systems and methods leverage a channel coding model that includes one or more neural networks, which offer enhanced adaptability to a wide range of parameters, including complex relationships that can exist between inputs and outputs. Since encoding schemes can involve multiple different parameters, determination of an ideal encoding scheme can be implemented much more efficiently and accurately using the disclosed deep machine learning techniques as opposed to manual statistical determinations.

The systems and methods described herein may further provide a technical effect and benefit of offering increased ability to adapt to a variety of communication channel scenarios. Communication channel conditions can change based on time, geographical position, radio frequency, fading, environmental factors and other contributing factors. The disclosed deep machine learning techniques can dynamically adapt under changing channel conditions so that enhanced encoding schemes are actively enhanced over time. For example, input data can be continuously fed into a trained channel coding model to determine enhanced encoding parameters and related encoding schemes in real time or near real time conditions. As such, when channel conditions change, corresponding changes to enhanced encoding schemes can also dynamically adapt to the changing channel conditions.

Systems and methods described herein can still further provide a technical effect and benefit of offering an ability to train a channel coding model in the field and without large sets of training data. Features can be provided that use backpropagation techniques for training an encoder model and decoder model within a channel coding model. Such a training method optionally enables training of the encoder model and decoder model using unlabeled data, thereby eliminating or at least reducing the need for labeled data and/or ground truth data, which may be difficult and/or costly to obtain in certain scenarios. The present disclosure further optionally enables training of the encoder model and/or decoder model in the field, thereby eliminating the need for aggregation of data from multiple other devices or sources to build a training data set.

The systems and methods described herein may also provide a technical effect and benefit of improving computer technology in the communication field by providing computing-based systems and methods for automatically determining one or more ideal channel encoding schemes for a communication channel. Conventional computing-based systems for determining such encodings may have involved programming explicit algorithms for determining such parameters. Use of machine-learned models to do this provides a much more feasible and efficient computing-based approach that can more easily adapt to changing channel conditions in the field. By improving the use of computing resources associated with encoding in a data transmission system, valuable memory, bandwidth and processing resources can be saved and/or dedicated for other aspects of data communication and signaling coordination.

In some implementations, in order to obtain the benefits of the techniques described herein, the user may be required to allow the collection and analysis of data for transmission over a communication channel, or other information associated with a user or user's computing device or communication device. Therefore, in some implementations, users can be provided with an opportunity to control settings associated with whether programs or features collect such information. If the user does not allow collection and use of such signals, then the user may not receive the benefits of the techniques described herein. In some implementations, the user can also be provided with tools to revoke or modify consent. In addition, in some implementations, certain information or data can be treated in one or more ways before it is stored or used, so that personally identifiable information is removed.

Thus, the present disclosure provides systems and methods that enable training of a channel coding model, particularly encoder model and/or decoder model portions thereof. The particular example applications described herein are provided as examples only. The systems and methods of the present disclosure can be applied to train any encoder model, channel model, decoder model, and/or channel coding model through the use of the disclosed training techniques.

With reference now to the Figures, example embodiments of the present disclosure will be discussed in further detail.

Example Devices and Systems

FIG. 1 depicts a block diagram of an example computing device 100 according to example embodiments of the present disclosure. The computing device 100 can be configured or operable to perform aspects of the present disclosure, including creation and/or use of a channel coding model 110 that includes an encoder model 112, a channel model 114 and a decoder model 116.

The computing device 100 can be any type of computing device, including a personal computer (e.g., desktop or laptop), a mobile computing device (e.g., smartphone or tablet), an embedded computing device, a server computing device, a network computing device such as a base station, router, beacon, other communication node, or other forms of computing devices. The computing device 100 can include one or more processors 102 and a memory 104. The one or more processors 102 can be any suitable processing device (e.g., a processor core, a microprocessor, an ASIC, a FPGA, a controller, a microcontroller, etc.) and can be one processor or a plurality of processors that are operatively connected. The memory 104 can include one or more non-transitory computer-readable storage mediums, such as RAM, ROM, EEPROM, EPROM, flash memory devices, magnetic disks, etc., and combinations thereof. The memory 104 can store data 106 and instructions 108 which are executed by the processor 102 to cause the computing device 100 to perform operations.

Figure 7:
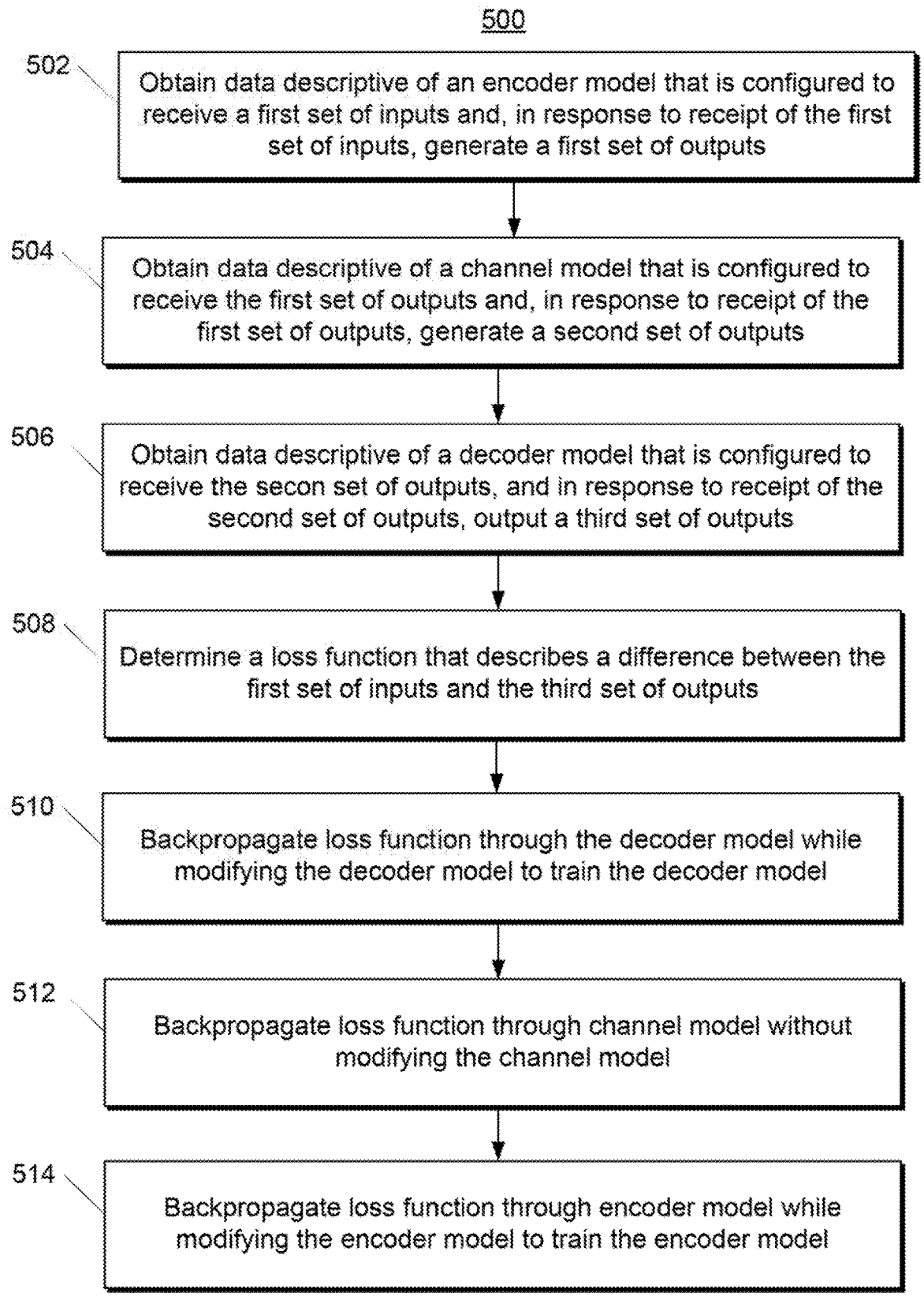
FIG. 7 depicts a flow chart diagram of an example method to perform machine learning according to example embodiments of the present disclosure.

The computing device 100 can store or otherwise include one or more machine-learned encoder models 112. For example, the encoder model 112 can be or can otherwise include various machine-learned models such as one or more neural networks (e.g., deep neural networks) or other multi-layer non-linear models. The encoder model 112 can be trained to encode input data for transmission over a communication channel according to the techniques described by the present disclosure. FIGS. 3, 4 and 7 variously include some aspects associated with training an encoder model 112.

Figure 8:
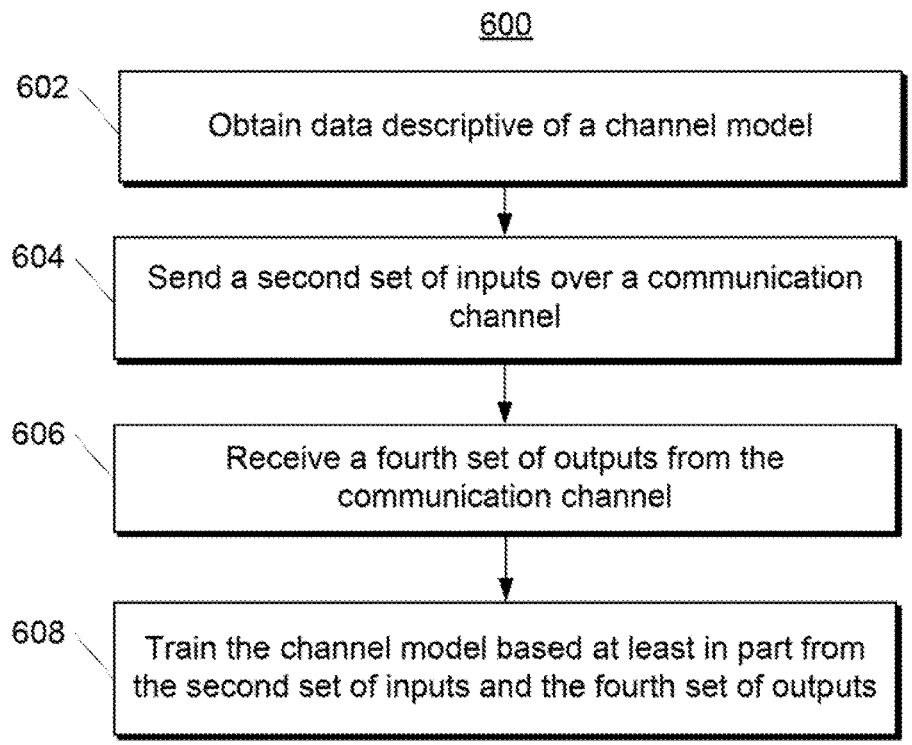
FIG. 8 depicts a flow chart diagram of a first additional aspect of an example method to perform machine learning according to example embodiments of the present disclosure.
Figure 9:
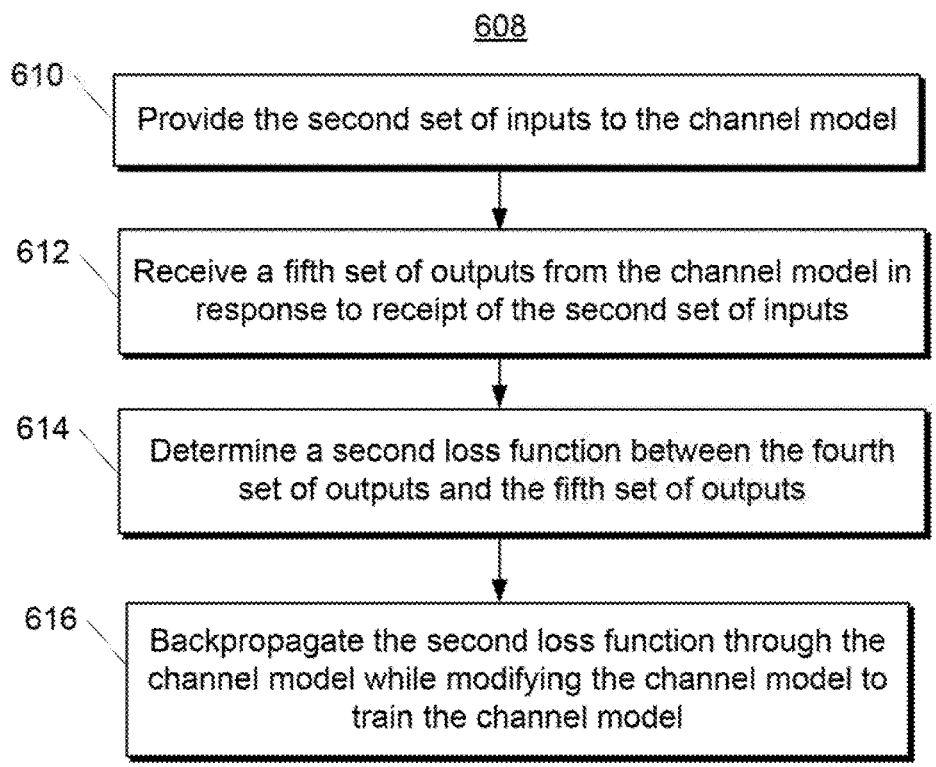
FIG. 9 depicts a flow chart diagram of a second additional aspect of an example method to perform machine learning according to example embodiments of the present disclosure.

The computing device 100 can store or otherwise include one or more machine-learned channel models 114. For example, the channel model 114 can be or can otherwise include various machine-learned models such as one or more neural networks (e.g., deep neural networks) or other multi-layer non-linear models. The channel model 114 can be trained to emulate a communication channel according to the techniques described by the present disclosure. FIGS. 5, 8 and 9 variously include some aspects associated with training a channel model 114. In some examples, the channel model 114 can be representative of a wireless channel (e.g., a radio frequency (RF) link). In some examples, the channel model 114 can be representative of a wired channel (e.g., a data transmission link for relaying data in accordance with Ethernet, LVDS, I2C, or other data transmission protocols).

The computing device 100 also stores or otherwise includes one or more decoder models 116. For example, the decoder model 116 can be or can otherwise include various machine-learned models such as one or more neural networks (e.g., deep neural networks) or other multi-layer non-linear models. The decoder model 116 can be trained to learn how to decode data coming out of a communication channel back into the original input data provided to the encoder model 112 and/or to the communication channel according to the techniques described by the present disclosure. FIGS. 3-4, 6-7 and 10-11 variously include some aspects associated with training a decoder model 116.

The computing device 100 can include a model trainer 118 that trains the channel coding model 110, including the encoder model 112, channel model 114 and decoder model 116 using various training or learning techniques, such as, for example, backwards propagation of one or more loss functions. For example, the model trainer 118 can train the channel model 114 of channel coding model 110 using example data that has been transmitted via a communication channel. The model trainer 118 can train the encoder model 112 and decoder model 116 using a loss function that describes a difference between input data input into the encoder model 112 and output data received from the decoder model 116. In particular, in some implementations, such a loss function can be backpropagated through the decoder model 116 while modifying the decoder model 116 (e.g., by modifying at least one weight of the decoder model 116). The loss function then can be backpropagated through the channel model 114 while the channel model 114 is held constant, and then backpropagated through the encoder model 112 while modifying the encoder model 112 (e.g., by modifying at least one weight of the encoder model 112). Backpropagating the loss function in such fashion enables modification of only the encoder model 112 and the decoder model 116, but not the channel model 114, since the role of the channel model 114 is to faithfully emulate the communication channel.

Model trainer 118 can be further configured to train the channel model 114 within channel coding model 110 using various training or learning techniques, such as, for example, backwards propagation of one or more loss functions. Channel model 114 can be trained to emulate or behave like a communication channel. In some examples, model trainer 118 can train channel model 114 using a loss function that describes a difference between an output of channel model 114 and an output of a communication channel, when a same set of input data is provided to both the communication channel and the channel model 114. In particular, in some implementations, such a loss function can be backpropagated through the channel model 114 while modifying the channel model 114 (e.g., by modifying at least one weight of the channel model 114).

In some implementations, model trainer 118 can also help to retrain the channel model 114 in order to adapt the channel coding model 110 and corresponding encoding scheme to changing conditions of a communication channel over time. For example, if the behavior of or conditions associated with a communication channel change over time, the channel model 114 can be retrained (e.g., on data recently transmitted via the communication channel) to emulate the new behavior of the communication channel. The encoder model 112 and decoder model 116 portions of the channel coding model 110 can then be retrained as described above using the updated channel model 114, thereby causing the encoder model 112 and decoder model 116 portions of the channel coding model 110 to learn an updated encoding scheme that is appropriate for the new communication channel conditions. Furthermore, in some implementations, the above described retraining of the channel coding model 110 can be performed in the field.

In some implementations, model trainer 118 can also help train channel coding model 110 by further training the decoder model 116 thereof. In some implementations, in addition to the training described above that enables the decoder model 116 to decode data coming out of the channel model 114, the decoder model 116 can be further trained (e.g., before or after the training described above) to learn how to decode data coming out of the communication channel (e.g., the actual communication channel used to train the channel model 114). More particularly, in some examples, model trainer 118 can train the decoder model 116 to decode data coming out of a communication channel back into the communication data provided as input to the communication channel. Model trainer 118 can further train decoder model 116 in such examples using a loss function that describes a difference between data provided as input to the communication channel and an output of decoder model 116. In other examples, model trainer 118 can train the decoder model 116 to decode data coming out of a communication channel back into an original set of input data that was encoded before being sent over a communication channel. Model trainer 118 can further train decoder model 116 in such examples using a loss function that describes a difference between data received as output from decoder model 116 to data provided as input to encoder model 112 before being sent through encoder model 112 then an actual communication channel before being received by decoder model 116. In some implementations, such loss functions can be backpropagated through the decoder model 116 while modifying the decoder model 116 (e.g., by modifying at least one weight of the decoder model 116).

The model trainer 118 can include computer logic utilized to provide desired functionality. The model trainer 118 can be implemented in hardware, firmware, and/or software controlling a general purpose processor. For example, in some implementations, the model trainer 118 includes program files stored on a storage device, loaded into a memory and executed by one or more processors. In other implementations, the model trainer 118 includes one or more sets of computer-executable instructions that are stored in a tangible computer-readable storage medium such as RAM hard disk or optical or magnetic media.

Thus, the computing device 100 can train the channel coding model 110 including encoder model 112, channel model 114 and decoder model 116 portions thereof locally and in the field and is, therefore, not required to communicate with another device to enable training of the channel coding model 110.

Figure 2:
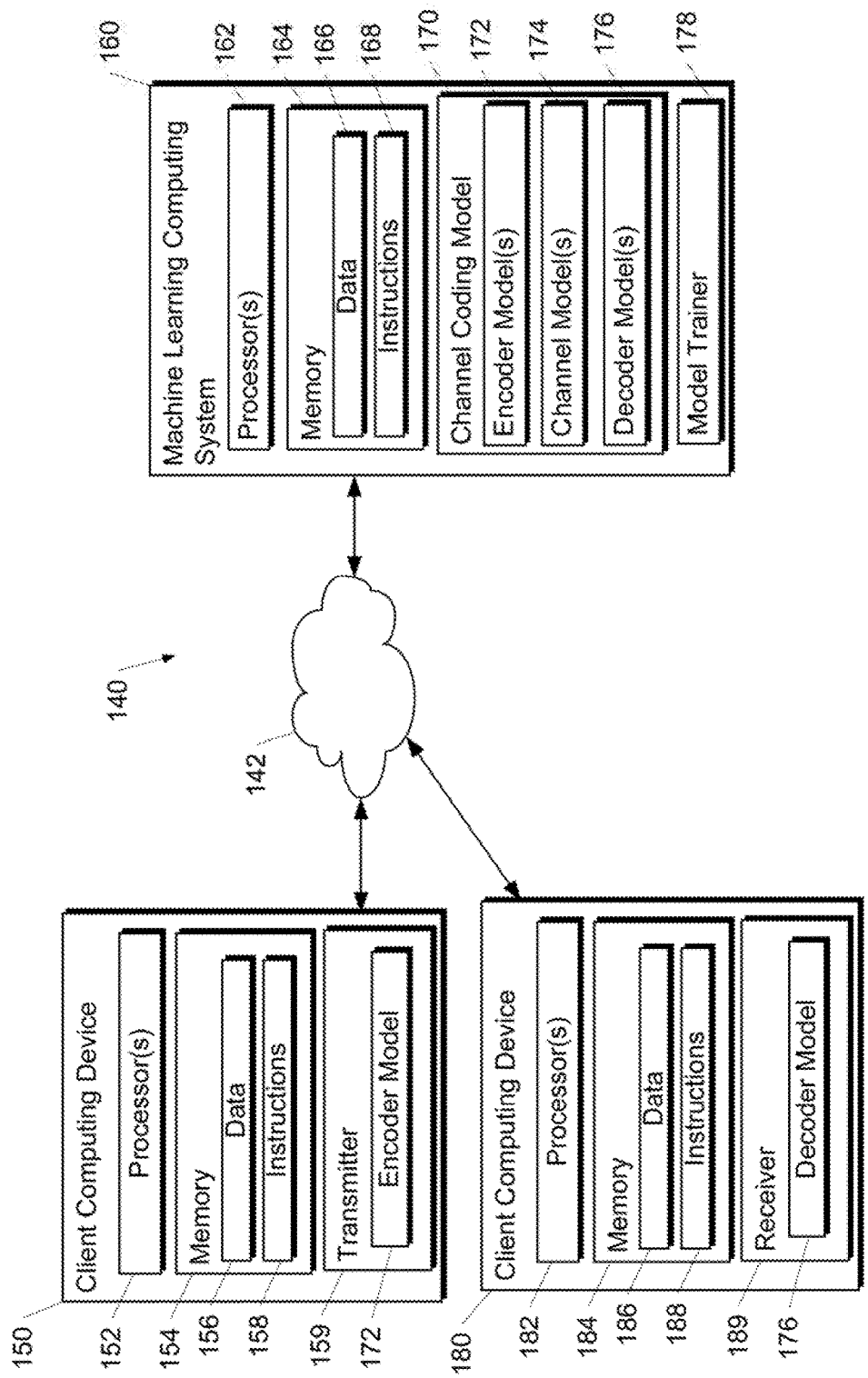
FIG. 2 depicts a block diagram of an example computing system according to example embodiments of the present disclosure.

FIG. 2 depicts a block diagram of an example computing system 140 according to example embodiments of the present disclosure. The system 140 includes a first client computing device 150, a second client computing device 180 and a machine learning computing system 160 that are communicatively connected over a network 142. Although only two client computing devices 150/180 are shown, any number of client computing devices 150/180 can be connected to the machine learning computing system 160 over the network 142.

The machine learning computing system 160 can include one or more processors 162 and a memory 164. The one or more processors 162 can be any suitable processing device (e.g., a processor core, a microprocessor, an ASIC, a FPGA, a controller, a microcontroller, etc.) and can be one processor or a plurality of processors that are operatively connected. The memory 164 can include one or more non-transitory computer-readable storage mediums, such as RAM, ROM, EEPROM, EPROM, flash memory devices, magnetic disks, etc., and combinations thereof. The memory 164 can store data 166 and instructions 168 which are executed by the processor 162 to cause the machine learning computing system 160 to perform operations.

In some implementations, the machine learning computing system 160 includes or is otherwise implemented by one or more server computing devices. In instances in which the machine learning computing system 160 includes plural server computing devices, such server computing devices can operate according to sequential computing architectures, parallel computing architectures, or some combination thereof.

The machine learning computing system 160 stores or otherwise includes one or more machine-learned channel coding models 170 including one or more encoder models 172, one or more channel models 174 and one or more decoder models 176. For example, the encoder models 172, channel models 174 and/or decoder models 176 can be or can otherwise include various machine-learned models such as neural networks (e.g., deep neural networks) or other multi-layer non-linear models.

In some implementations, the computing system 160 can store a plurality of encoder models 172 that respectively correspond to a plurality of client computing devices 150. In some implementations, the plurality of encoder models 172 can be respectively trained on data that is specific to the corresponding client computing device 150. For example, the input data used to train each encoder model 172 can be received from the corresponding client computing device 150. Such can enable, for example, device-specific training of encoder models 172, which can correspond to encoder models 172 designed for use on device-specific communication channels or other device-specific environments.

In some implementations, the system 160 can store a plurality of decoder models 176 that respectively correspond to a plurality of client computing devices 180. In some implementations, the plurality of decoder models 176 can be respectively trained on data that is specific to the corresponding client computing device 180. For example, the input data used to train each decoder model 176 can be received from the corresponding client computing device 180. Such can enable, for example, device-specific training of decoder models 176, which can correspond to decoder models 176 designed for use on device-specific communication channels or other device-specific environments.

The machine learning computing system 160 can include a model trainer 178 that trains the channel coding model 170, including the encoder model 172, channel model 174 and decoder model 176 using various training or learning techniques, such as, for example, backwards propagation of one or more loss functions. In some implementations, the input data used to train the models 170-176 can be provided or otherwise selected by the client computing devices 150/180 (e.g., data that has been transmitted via a communication channel associated with client computing devices 150 and/or client computing devices 180). The model trainer 178 can train the encoder model 172 and decoder model 176 using a loss function that describes a difference between input data input into the encoder model 172 and output data received from the decoder model 176. In particular, in some implementations, such a loss function can be backpropagated through the decoder model 176 while modifying the decoder model 176 (e.g., by modifying at least one weight of the decoder model). The loss function then can be backpropagated through the channel model 174 while the channel model 174 is held constant, and then backpropagated through the encoder model 172 while modifying the encoder model 172. Backpropagating the loss function in such fashion enables modification of only the encoder model 172 and the decoder model 176, but not the channel model 174, since the role of the channel model 174 is to faithfully emulate the communication channel.

Model trainer 178 can be further configured to train the channel model 174 within channel coding model 170 using various training or learning techniques, such as, for example, backwards propagation of one or more loss functions. Channel model 174 can be trained to emulate or behave like a communication channel. In some examples, model trainer 178 can train channel model 174 using a loss function that describes a difference between an output of channel model 174 and an output of a communication channel, when a same set of input data is provided to both the communication channel and the channel model 174. In particular, in some implementations, such a loss function can be backpropagated through the channel model 174 while modifying the channel model 174 (e.g., by modifying at least one weight of the channel model 174).

In some implementations, model trainer 178 can also help to retrain the channel model 174 in order to adapt the channel coding model 170 and corresponding encoding scheme to changing conditions of a communication channel over time. For example, if the behavior of or conditions associated with a communication channel change over time, the channel model 174 can be retrained (e.g., on data recently transmitted via the communication channel) to emulate the new behavior of the communication channel. The encoder model 172 and decoder model 176 portions of the channel coding model 170 can then be retrained as described above using the updated channel model 174, thereby causing the encoder model 172 and decoder model 176 portions of the channel coding model 170 to learn an updated encoding scheme that is appropriate for the new communication channel conditions. Furthermore, in some implementations, the above described retraining of the channel coding model 170 can be performed in the field.

In some implementations, model trainer 178 can also help train channel coding model 170 by further training the decoder model 176 thereof. In some implementations, in addition to the training described above that enables the decoder model 176 to decode data coming out of the channel model 174, the decoder model 176 can be further trained (e.g., before or after the training described above) to learn how to decode data coming out of the communication channel (e.g., the actual communication channel used to train the channel model 174). More particularly, in some examples, model trainer 178 can train the decoder model 176 to decode data coming out of a communication channel back into the communication data provided as input to the communication channel. Model trainer 178 can further train decoder model 176 in such examples using a loss function that describes a difference between data provided as input to the communication channel and an output of decoder model 176. In other examples, model trainer 178 can train the decoder model 176 to decode data coming out of a communication channel back into an original set of input data that was encoded before being sent over a communication channel. Model trainer 178 can further train decoder model 176 in such examples using a loss function that describes a difference between data received as output from decoder model 176 to data provided as input to encoder model 172 before being sent through encoder model 172 then an actual communication channel before being received by decoder model 176. In some implementations, such loss functions can be backpropagated through the decoder model 176 while modifying the decoder model 176 (e.g., by modifying at least one weight of the decoder model 176).

The model trainer 178 can include computer logic utilized to provide desired functionality. The model trainer 178 can be implemented in hardware, firmware, and/or software controlling a general purpose processor. For example, in some implementations, the model trainer 178 includes program files stored on a storage device, loaded into a memory and executed by one or more processors. In other implementations, the model trainer 178 includes one or more sets of computer-executable instructions that are stored in a tangible computer-readable storage medium such as RAM hard disk or optical or magnetic media.

The system 140 can further include the client computing device 150 communicatively coupled over the network 142. The client computing device 150 can be any type of computing device, such as, for example, a personal computing device (e.g., laptop or desktop), a mobile computing device (e.g., smartphone or tablet), a router, a base station, a beacon, or any other type of computing device.

The client computing device 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the client computing device 150 to perform operations.

Client computing devices 150 can respectively include a transmitter 159 including an encoder model 172. The transmitter 159 can be configured to encode communication data prior to transmission of the communication data via a communication channel. The client computing device 150 can receive the encoder model 172 from the machine learning computing system 160 after it has been trained by the model trainer 178. The client computing device 150 can store the encoder model 172 and use it to automatically devise encoding schemes for new data before it is communicated over a communication channel. The client computing device 150 can periodically communicate with the machine learning computing system 160 to update or otherwise re-train the encoder model 172.

The system 140 can further include the client computing device 180 communicatively coupled over the network 142. The client computing device 180 can be any type of computing device, such as, for example, a personal computing device (e.g., laptop or desktop), a mobile computing device (e.g., smartphone or tablet), a router, a base station, a beacon, or any other type of computing device.

The client computing device 180 can include one or more processors 182 and a memory 184. The one or more processors 182 can be any suitable processing device (e.g., a processor core, a microprocessor, an ASIC, a FPGA, a controller, a microcontroller, etc.) and can be one processor or a plurality of processors that are operatively connected. The memory 184 can include one or more non-transitory computer-readable storage mediums, such as RAM, ROM, EEPROM, EPROM, flash memory devices, magnetic disks, etc., and combinations thereof. The memory 184 can store data 186 and instructions 188 which are executed by the processor 182 to cause the client computing device 180 to perform operations.

Client computing devices 180 can respectively include a receiver 189 including a decoder model 176. The receiver 189 can be configured to decode communication data received from communication channel. The client computing device 180 can receive the decoder model 176 from the machine learning computing system 160 after it has been trained by the model trainer 178. The client computing device 180 can store the decoder model 176 and use it to automatically decode data coming out of a communication channel back into original input data provided to an encoder model and/or communication channel. The client computing device 180 can periodically communicate with the machine learning computing system 160 to update or otherwise re-train the decoder model 176.

The network 142 can be any type of communications network, such as a local area network (e.g., intranet), wide area network (e.g., Internet), or some combination thereof and can include any number of wired or wireless links. In general, communication over the network 142 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Model Arrangements

FIG. 3 depicts a block diagram of a first aspect of an example model training technique according to example embodiments of the present disclosure. More particularly, FIG. 3 depicts a channel coding model 200 that includes an encoder model 202 configured to receive a first set of inputs 204 and, in response to receipt of the first set of inputs 204, generate a first set of outputs 206. The encoder model 202 can be, for example, a neural network such as a deep neural network or other multi-layer non-linear model. In some implementations, the first set of inputs 204 can be expressed according to a first set of dimensions and the first set of outputs 206 can be expressed according to a second set of dimensions that are different than the first set of dimensions. The second set of dimensions can include a relatively smaller number of dimensions than the first set of dimensions or vice versa. Further, in some implementations, the first set of inputs 204 can include arbitrary, unlabeled, real-world data.

The channel coding model 200 of FIG. 3 can also include a channel model 208 that can be trained to emulate a communication channel. As such, the channel model 208 can be configured to receive a set of inputs (e.g., the first set of outputs 206 generated by the encoder model 202) and, in response to receipt of the first set of outputs 206, generate a second set of outputs 210. The channel model 208 can be, for example, a neural network such as a deep neural network or other multi-layer non-linear model. In some implementations, the first set of outputs 206 provided as input to the channel model 208 can be expressed according to the second set of dimensions and the second set of outputs 210 can be expressed according to the same second set of dimensions. In some examples, the channel model 208 can be trained to emulate a wireless channel (e.g., a radio frequency (RF) link). In some examples, the channel model 208 can be trained to emulate a wired channel (e.g., a data transmission link for relaying data in accordance with Ethernet, LVDS, I2C, or other data transmission protocols).

Referring still to FIG. 3, channel coding model 300 can also include a decoder model 212. Decoder model 212 can be configured to receive a set of inputs (e.g., the second set of outputs 210 generated by the channel model 208) and, in response to receipt of the second set of outputs 210, generate a third set of outputs 214. The decoder model 212 can be, for example, a neural network such as a deep neural network or other multi-layer non-linear model.

In some implementations, the third set of outputs 214 can be expressed according to the first set of dimensions. Thus, in some implementations, while the encoder model 202 transforms data from the first set of dimensions to the second set of dimensions, the decoder model 212 transforms data from the second set of dimensions back into the first set of dimensions. As such, the decoder model 212 can be said to have performed an inverse transformation relative to the encoder model 202.

In this respect, the encoder model 202 and decoder model 212 of the present disclosure, when taken together, are in some respects similar to an autoencoder. For example, an autoencoder can typically include an encoder portion and a decoder portion with a relatively narrow connection of data transfer between the two portions. However, the disclosed channel coding model 200 incorporates a third portion, namely a channel model 208, in between encoder model 202 and decoder model 212 portions. Providing a channel model 208 between an encoder model 202 and a decoder model 212 provides an ability to model the addition of noise to an output of the encoder model 202, such as would be present in numerous applications when data is transmitted over a wired and/or wireless noisy communication channel before being received and evaluated by a decoder.

More particularly, FIG. 3 depicts a block diagram of an example loss function (e.g., first loss function 216) defined between the first set of inputs 204 and the third set of outputs 214. The first loss function 216 can describe a difference between the first set of inputs 204 and the third set of outputs 214. For example, the first loss function 216 can be a squared difference between the first set of inputs 204 and the third set of outputs 214 (e.g., a sum of a squared difference for each dimension in the first set of dimensions). However, loss functions other than a squared difference can be used as well, including, for example, loss functions that include various weightings (e.g., a particular weight applied to each dimension in the first set of dimensions).

FIG. 4 depicts a block diagram of a second aspect of an example model training technique according to example embodiments of the present disclosure. More particularly, to train the decoder model 212, the first loss function 216 can be backpropagated through the decoder model 212 while modifying the decoder model 212 to train the decoder model 212, for example, by modifying at least one weight associated with the decoder model 212. After backpropagating the first loss function 216 through the decoder model 212, the first loss function 216 can continue to be backpropagated through the channel model 208 without modifying the channel model 208. After backpropagating the first loss function 216 through the channel model 208, the first loss function 216 can be backpropagated through the encoder model 202 while modifying the encoder model 202 to train the encoder model 202, for example, by modifying at least one weight associated with the encoder model 202. As such, both the encoder model 202 and decoder model 212 can be trained relative to the inputs and outputs of the channel model 208.

In some implementations, machine learning tools such as TensorFlow and/or Theano can be used to perform the backpropagation of the first loss function 216 illustrated in FIGS. 3 and 4. As one example, backpropagation of the first loss function 216 through the channel model 208 without modification of the channel model 208 can be performed by: programming the channel model 208 as a graph or series of one or more operations or nodes; setting one or more learnable flags associated with the channel model 208 to false; and then backpropagating the first loss function 216 through the decoder model 208. By contrast, one or more learnable flags associated with the encoder model 202 and decoder model 212 can be set to true to allow modification of the encoder model 202 and decoder model 212 during backpropagation of the first loss function 216 through the encoder model 202 and decoder model 212.

FIG. 5 depicts a block diagram of a third aspect of an example model training technique according to example embodiments of the present disclosure. More particularly, FIG. 5 depicts various aspects associated with training a channel model 208 to emulate or behave like a communication channel 302. As such, a second set of inputs 304 can be sent over an actual communication channel 302 and a fourth set of outputs 306 can be received from the communication channel 302 in response to receipt of the second set of inputs 304. The channel model 208 can be trained based at least in part from the second set of inputs 304 to the communication channel 302 and the fourth set of outputs 306 received from the communication channel 302. In some examples, the fourth set of outputs 306 from the communication channel 302 can be compared to a fifth set of outputs 308 output by the channel model 208 in response to receipt of the second set of inputs 304 to generate a loss function (e.g., a second loss function 310). The second loss function 310 can describe a difference between the fourth set of outputs 306 and the fifth set of outputs 308. In some examples, the second loss function 310 can describe a difference in the distribution of noise between the fourth set of outputs 306 and the fifth set of outputs 308. The second loss function 310 can be backpropagated through the channel model 208 to train the channel model, for example, by modifying at least one weight associated with the channel model. In some implementations, machine learning tools such as TensorFlow and/or Theano can be used to perform the backpropagation of the second loss function 310.

FIG. 6 depicts a block diagram of a fourth aspect of an example model training technique according to example embodiments of the present disclosure. More particularly, FIG. 6 depicts various aspects associated with further training a decoder model 212. In some implementations, in addition to the training described above relative to FIGS. 3 and 4 that enables the decoder model 212 to decode data coming out of the channel model 208, the decoder model 212 can be further trained (e.g., before or after the training described above) to learn how to decode data coming out of the communication channel 302 (e.g., the actual communication channel 302 used to train the channel model 208, as depicted in FIG. 5).

More particularly, in some examples, the decoder model 212 can be trained to decode data coming out of a communication channel 302 back into the communication data provided as input to the communication channel. Consider the second set of inputs 304 described above provided to a communication channel 302, from which a fourth set of outputs 306 is received. The fourth set of outputs 306 can be provided to the decoder model 212, which can generate a sixth set of outputs 312 in response to receipt of the fourth set of outputs 306. In one example, the sixth set of outputs 312 from the decoder model 212 can be compared to the second set of inputs 304 to the communication channel 302 to determine a loss function (e.g., a third loss function 314). The third loss function 314 can describe a difference between the second set of inputs 304 and the sixth set of outputs 312. The third loss function 314 can be backpropagated through the decoder model 212 while modifying the decoder model 212 to train the decoder model (e.g., by modifying one or more weights associated with the decoder model 212) to generate outputs that attempt to reconstruct the data provided to the communication channel 302. In some implementations, machine learning tools such as TensorFlow and/or Theano can be used to perform the backpropagation of the third loss function 314.

More particularly, in other examples, the decoder model 212 can be trained to decode data coming out of a communication channel 302 back into an original set of input data that was encoded before being sent over a communication channel 302. For instance, consider that the second set of inputs 304 to the communication channel 302 corresponds to a set of outputs generated by an encoder model 202 in response to receipt of a third set of inputs 316 provided to the encoder model 202. In such instance, a fourth loss function 318 can be determined that compares the sixth set of outputs 312 from the decoder model 212 to the third set of inputs 316 provided to the encoder model 202. The fourth loss function 318 can describe a difference between the third set of inputs 316 and the sixth set of outputs 312. The fourth loss function 318 can be backpropagated through the decoder model 212 while modifying the decoder model 212 to train the decoder model (e.g., by modifying one or more weights associated with the decoder model 212) to generate outputs that attempt to reconstruct the data provided to the encoder model 202. In some implementations, machine learning tools such as TensorFlow and/or Theano can be used to perform the backpropagation of the fourth loss function 318.

Example Methods

FIGS. 7-13, respectively, set forth aspects associated with one or more computer-implemented methods according to example embodiments of the present disclosure. In some embodiments, the computer-implemented methods of FIGS. 7-13 can include other features or steps disclosed herein. In some embodiments, a computing device, computing system, transmitter, receiver or other example system or device as described with reference to FIGS. 1 and 2 or other example systems or devices can implement some or all of the methods depicted in FIGS. 7-13. In some embodiments, one or more tangible, non-transitory computer-readable media storing computer-readable instructions that when executed by one or more processors cause the one or more processors to perform operations, the operations comprising steps as set forth in one or more of the methods depicted in FIGS. 7-13.

FIG. 7 depicts a flow chart diagram of an example method 500 to perform machine learning according to example embodiments of the present disclosure. Some aspects of method 500 are similarly depicted and described with reference to FIGS. 3 and 4.

At 502, one or more computing devices obtain data descriptive of an encoder model that is configured to receive a first set of inputs and, in response to receipt of the first set of inputs, generate a first set of outputs. In some implementations, the encoder model for which data is obtained at 502 is configured to receive the first set of inputs expressed according to a first set of dimensions; and output the first set of outputs expressed according to a second set of dimensions that are different from the first set of dimensions. In some implementations, the encoder model is a neural network.

At 504, one or more computing devices obtain data descriptive of a channel model that is configured to receive the first set of outputs and, in response to receipt of the first set of outputs, generate a second set of outputs. In some implementations, the channel model for which data is obtained at 504 is configured to receive the first set of outputs expressed according to the second set of dimensions; and output the second set of outputs expressed according to the same second set of dimensions. In some implementations, the channel model is a neural network.

At 506, one or more computing devices obtain data descriptive of a decoder model that is configured to receive the second set of outputs and, in response to receipt of the second set of outputs, generate a third set of outputs. In some implementations, the decoder model for which data is obtained at 506 is configured to receive the second set of outputs expressed according to the second set of dimensions; and output the third set of outputs expressed according to the first set of dimensions. In some implementations, the decoder model is a neural network. Thus, in some implementations, while the encoder model transforms data from the first set of dimensions to the second set of dimensions, the decoder model transforms data from the second set of dimensions back into the first set of dimensions. As such, the decoder model can be said to have performed an inverse transformation relative to the encoder model.

At 508, one or more computing devices determine a loss function that describes a difference between the first set of inputs and the third set of outputs. The loss function determined at 508 can then be backpropagated at 510 through the decoder model while modifying the decoder model to train the decoder model (e.g., by modifying at least one weight associated with the decoder model). After the backpropagation at 510, the loss function determined at 508 can then be backpropagated at 512 through the channel model without modifying the channel model. After the backpropagation at 512, the loss function determined at 508 can then be backpropagated at 514 through the encoder model while modifying the encoder model to train the encoder model (e.g., by modifying at least one weight associated with the encoder model).

FIG. 8 depicts a flow chart diagram of a first additional aspect of an example method to perform machine learning according to example embodiments of the present disclosure. More particularly, method 600 includes aspects associated with training a channel model. Some aspects of method 600 are similarly depicted and described with reference to FIG. 5. At 602, one or more computing devices can obtain data descriptive of a channel model. In some examples the channel model is configured to receive a set of inputs and in response, to receipt of the set of inputs, generate a set of outputs. In some implementations, the channel model is a neural network. At 604, one or more computing devices can send a second set of inputs over an actual communication channel. At 606, one or more computing devices can receive a fourth set of outputs from the communication channel in response to receipt of the second set of inputs sent at 604. A channel model then can be trained at 608 based at least in part from the second set of inputs sent over the communication channel at 604 and the fourth set of outputs received from the communication channel at 606.

FIG. 9 depicts a flow chart diagram of a second additional aspect of an example method to perform machine learning according to example embodiments of the present disclosure. More particularly, FIG. 9 depicts a more particular implementation of training at 608 a channel model based at least in part from the second set of inputs and the fourth set of outputs. At 610, one or more computing devices can provide the second set of inputs to the channel model (e.g., the channel model for which data is obtained at 602). At 612, one or more computing devices can receive a fifth set of outputs from the channel model in response to receipt of the second set of inputs provided at 610. At 614, one or more computing devices can determine a second loss function that describes a difference between the fourth set of outputs and the fifth set of outputs. The second loss function determined at 614 can then be backpropagated at 616 through the channel model while modifying the channel model to train the channel model (e.g., by modifying at least one weight associated with the channel model).

Figure 10:
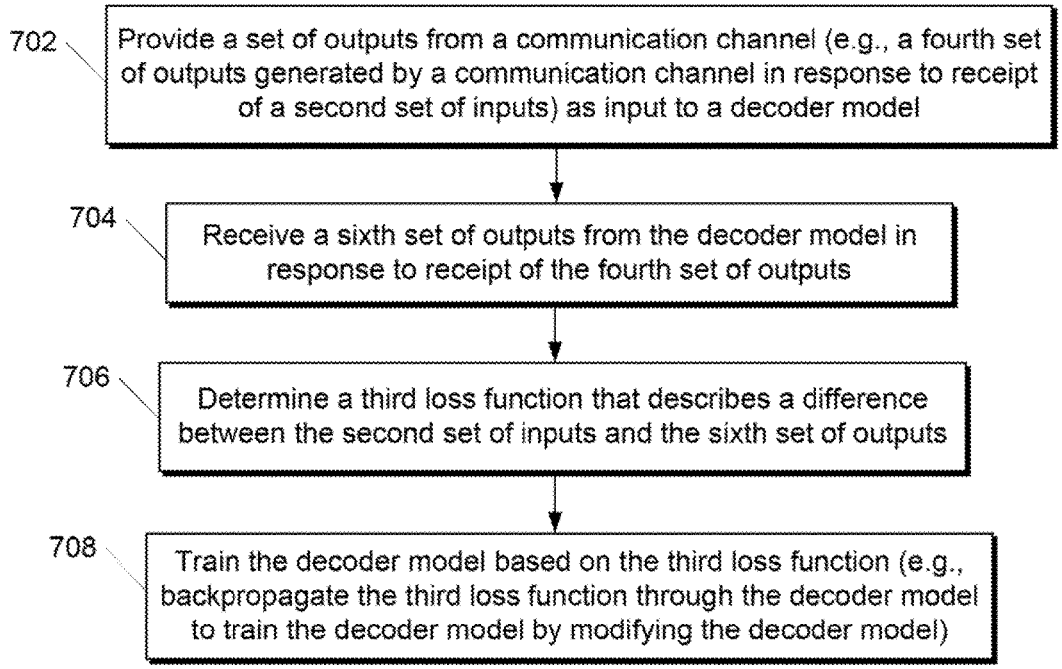
FIG. 10 depicts a flow chart diagram of a third additional aspect of an example method to perform machine learning according to example embodiments of the present disclosure.

FIG. 10 depicts a flow diagram of a third additional aspect of an example method to perform machine learning according to example embodiments of the present disclosure. More particularly, FIG. 10 depicts an example method 700 of implementing additional decoder model training. At 702, one or more computing devices can provide a set of outputs from a communication channel as input to a decoder model. In some examples, the input to a decoder model provided at 702 corresponds to the fourth set of outputs generated by a communication channel in response to receipt of a second set of inputs, as described in FIG. 6. At 704, one or more computing devices can receive a sixth set of outputs from the decoder model in response to receipt of the fourth set of outputs at 702. At 706, one or more computing devices can determine a third loss function that describes a difference between the second set of inputs and the sixth set of outputs. At 708, one or more computing devices can train the decoder model based on the third loss function determined at 706. In some examples, training the decoder model at 708 based on the third loss function involves backpropagating the third loss function through the decoder model to train the decoder model by modifying the decoder model (e.g., by modifying at least one weight associated with the decoder model).

Figure 11:
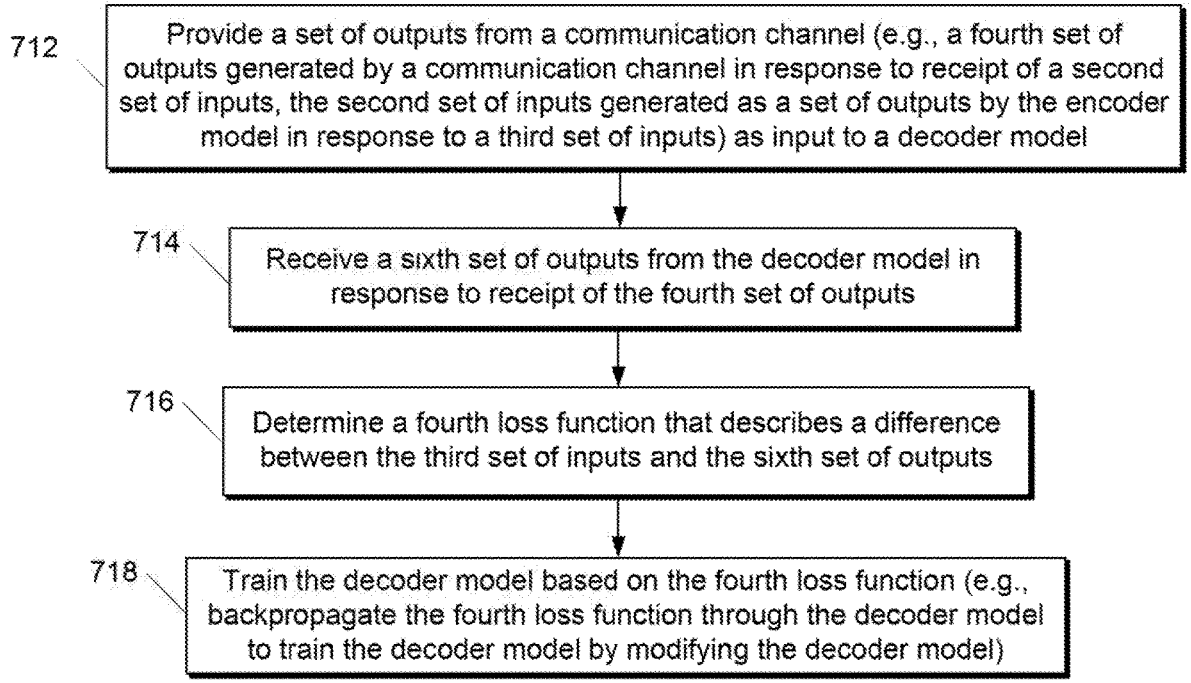
FIG. 11 depicts a flow chart diagram of a fourth additional aspect of an example method to perform machine learning according to example embodiments of the present disclosure.

FIG. 11 depicts a flow diagram of a fourth additional aspect of an example method to perform machine learning according to example embodiments of the present disclosure. More particularly, FIG. 11 depicts an example method 710 of implementing additional decoder model training. At 712, one or more computing devices can provide a set of outputs from a communication channel as input to a decoder model. In some examples, the input to a decoder model provided at 712 corresponds to the fourth set of outputs generated by a communication channel in response to receipt of a second set of inputs, the second set of inputs generated as a set of outputs by the encoder model in response to a third set of inputs, as described in FIG. 6. At 714, one or more computing devices can receive a sixth set of outputs from the decoder model in response to receipt of the fourth set of outputs at 712. At 716, one or more computing devices can determine a fourth loss function that describes a difference between the third set of inputs and the sixth set of outputs. At 718, one or more computing devices can train the decoder model based on the fourth loss function determined at 716. In some examples, training the decoder model at 718 based on the fourth loss function involves backpropagating the fourth loss function through the decoder model to train the decoder model by modifying the decoder model (e.g., by modifying at least one weight associated with the decoder model).

Figure 12:
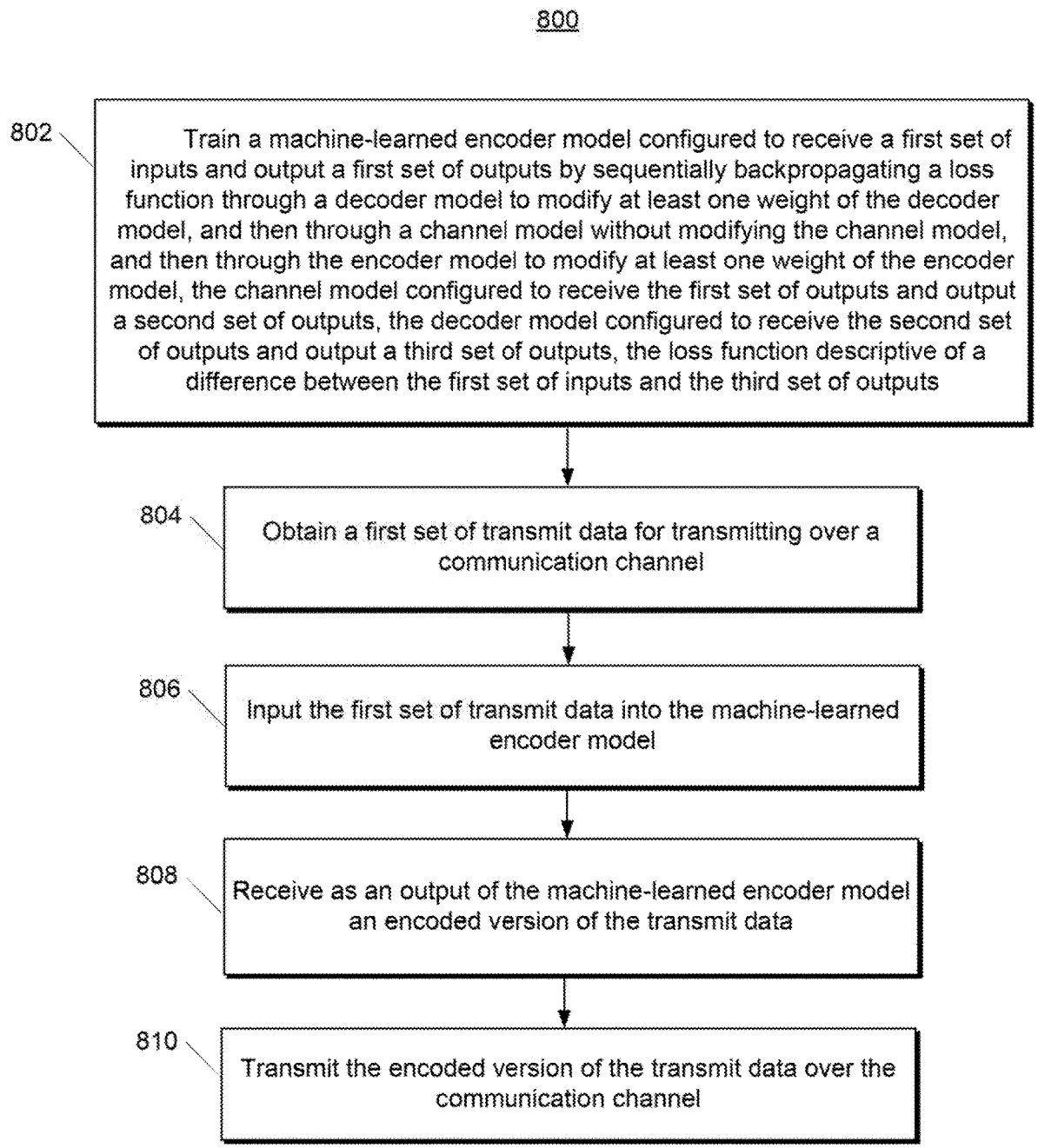
FIG. 12 depicts a flow chart diagram of an example method of encoding communication data according to example embodiments of the present disclosure.

FIG. 12 depicts a flow chart diagram of an example method 800 of encoding communication data according to example embodiments of the present disclosure. In some embodiments, example method 800 can be implemented by a computing device including a transmitter (e.g., computing device 150 including a transmitter 159 as depicted in FIG. 2).

At 802, one or more computing devices can train a machine-learned encoder model configured to receive a first set of inputs and output a first set of outputs. The machine-learned encoder model can be trained at 802 by sequentially backpropagating a loss function through a decoder model to modify at least one weight of the decoder model, and then through a channel model without modifying the channel model, and then through the encoder model to modify at least one weight of the encoder model. The channel model used to train the encoder model at 802 can be configured to receive the first set of outputs and output a second set of outputs. The decoder model used to train the encoder model at 802 can be configured to receive the second set of outputs and output a third set of outputs. The loss function used to train the encoder model at 802 can be descriptive of a difference between the first set of inputs and the third set of outputs Referring still to FIG. 12, at 804, one or more computing devices can obtain a first set of transmit data for transmitting over a communication channel. At 806, one or more computing devices can input the first set of transmit data obtained at 804 into the machine-learned encoder model trained at 802. At 808, one or more computing devices can receive as an output of the machine-learned encoder model an encoded version of the transmit data. At 810, one or more computing devices can transmit the encoded version of the transmit data over the communication channel. In this manner, a transmitter device or component can implement method 800 of FIG. 12 to encode communication data prior to transmission of the communication data via the communication channel and transmit an encoded version of the transmit data over the communication channel.

FIG. 13 depicts a flow chart diagram of an example method 900 of decoding communication data according to example embodiments of the present disclosure. In some embodiments, example method 900 can be implemented by a computing device including a receiver (e.g., computing device 180 including a receiver 189 as depicted in FIG. 2).

At 902, one or more computing devices can train a machine-learned decoder model. The machine-learned decoder model can be trained at 902 by sequentially backpropagating a loss function through a decoder model to modify at least one weight of the decoder model, and then through a channel model without modifying the channel model, and then through the encoder model to modify at least one weight of the encoder model. The channel model used to train the decoder model at 902 can be configured to receive the first set of outputs and output a second set of outputs. The decoder model used to train the decoder model at 902 can be configured to receive the second set of outputs and output a third set of outputs. The loss function used to train the decoder model at 902 can be descriptive of a difference between the first set of inputs and the third set of outputs.

Referring still to FIG. 13, at 904, one or more computing devices can obtain a first set of communication data received from a communication channel. For example, the communication data obtained at 904 could correspond to a transmitted encoded version of transmit data, such as the data transmitted over a communication channel at 810 in FIG. 12. At 906, one or more computing devices can input the first set of communication data obtained at 904 into the machine-learned decoder model trained at 902. At 908, one or more computing devices can receive as an output of the machine-learned decoder model a decoded version of the communication data. At 910, one or more computing devices can provide the decoded version of the communication data as output. In some examples, the decoded version of the communication data received at 908 can be provided to one or more other computing devices or components.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 7-13 respectively depict steps performed in a particular order for purposes of illustration and discussion, the methods of the present disclosure are not limited to the particularly illustrated order or arrangement. The various steps of the methods 500, 600, 608, 700, 710, 800 and 900 can be omitted, rearranged, combined, and/or adapted in various ways without deviating from the scope of the present disclosure.

What is claimed is:

1. A computing system to perform machine learning, the computing system comprising:
   at least one processor; and
   at least one tangible, non-transitory computer-readable medium that stores instructions that, when executed by the at least one processor, cause the computing system to:
   obtain data descriptive of a model that comprises an encoder model, a channel model and a decoder model, wherein the encoder model is configured to receive a first set of inputs and, in response to receipt of the first set of inputs, generate a first set of outputs, wherein the channel model is configured to receive the first set of outputs and, in response to receipt of the first set of outputs, generate a second set of outputs, and wherein the decoder model is configured to receive the second set of outputs and, in response to receipt of the second set of outputs, generate a third set of outputs;
   determine a first loss function that describes a difference between the first set of inputs and the third set of outputs;
   backpropagate the first loss function through the decoder model while modifying the decoder model to train the decoder model;
   after backpropagating the first loss function through the decoder model, continue to backpropagate the first loss function through the channel model without modifying the channel model;
   after backpropagating the first loss function through the channel model, continue to backpropagate the first loss function through the encoder model while modifying the encoder model to train the encoder model;
   send a second set of inputs over a communication channel;
   receive a fourth set of outputs from the communication channel; and
   train the channel model based at least in part from the second set of inputs and the fourth set of outputs.

2. The computing system of claim 1, wherein training the channel model based at least in part from the second set of inputs and the fourth set of outputs comprises:
   providing the second set of inputs to the channel model and receiving a fifth set of outputs from the channel model in response to receipt of the second set of inputs;
   determining a second loss function between the fourth set of outputs and the fifth set of outputs; and
   backpropagating the second loss function through the channel model while modifying the channel model to train the channel model.

3. The computing system of claim 1, wherein the decoder model is further configured to receive the fourth set of outputs and, in response to receipt of the fourth set of outputs, generate a sixth set of outputs.

4. The computing system of claim 3, wherein the instructions further cause the computing system to:
   determine a third loss function that describes a difference between the second set of inputs and the sixth set of outputs; and
   backpropagate the third loss function through the decoder model while modifying the decoder model to train the decoder model.

5. The computing system of claim 3, wherein the second set of inputs sent over the communication channel comprises an output of the encoder model generated by the encoder model in response to receipt of a third set of inputs.

6. The computing system of claim 5, wherein the instructions further cause the computing system to:
   determine a fourth loss function that describes a difference between the third set of inputs and the sixth set of outputs; and
   backpropagate the fourth loss function through the decoder model while modifying the decoder model to train the decoder model.

7. The computing system of claim 1, wherein one or more of the encoder model, the channel model and the decoder model comprises a neural network.

8. The computing system of claim 1, wherein the model comprises a wireless communication model that includes a channel model trained to emulate a wireless communication channel.

9. The computing system of claim 1, wherein the model comprises a wired communication model that includes a channel model trained to emulate a wired communication channel.

10. The computing system of claim 1, wherein:
    the encoder model is configured to receive the first set of inputs expressed according to a first set of dimensions;
    the encoder model is configured to output the first set of outputs expressed according to a second set of dimensions in response to receipt of the first set of inputs; and
    the decoder model is configured to output the third set of outputs expressed according to the first set of dimensions.

11. A computing device that determines an encoding scheme for a communication channel, comprising:
    at least one processor;
    a machine-learned encoder model that is configured to receive a first set of inputs and output a first set of outputs, the encoder model having been trained by sequentially backpropagating a loss function through a decoder model to modify at least one weight of the decoder model, and then through a channel model without modifying the channel model, and then through the encoder model to modify at least one weight of the encoder model, the channel model configured to receive the first set of outputs and output a second set of outputs, the decoder model configured to receive the second set of outputs and output a third set of outputs, the loss function descriptive of a difference between the first set of inputs and the third set of outputs, wherein the channel model used to train the encoder model is trained by:
    sending a second set of inputs over a communication channel;
    receiving a fourth set of inputs from the communication channel;
    providing the second set of inputs to the channel model and receiving a fifth set of outputs from the channel model in response to receipt of the second set of inputs;
    determining a second loss function between the fourth set of outputs and the fifth set of outputs; and
    backpropagating the second loss function through the channel model while modifying the channel model to train the channel model; and
    at least one tangible, non-transitory computer-readable medium that stores instructions that, when executed by the at least one processor, cause the at least one processor to:
    obtain a first set of transmit data for transmitting over a communication channel;

input the first set of transmit data into the machine-learned encoder model;
receive, as an output of the machine-learned channel encoder model, an encoded version of the transmit data; and
transmit the encoded version of the transmit data over the communication channel.

12. The computing device of claim 11, wherein the encoder model comprises a deep neural network.

13. The computing device of claim 11, wherein the decoder model used to train the encoder model is further trained by:
receiving the fourth set of outputs and, in response to receipt of the fourth set of outputs, generating a sixth set of outputs;
determining a third loss function that describes a difference between the second set of inputs and the sixth set of outputs; and
backpropagating the third loss function through the decoder model while modifying the decoder model to train the decoder model.

14. One or more tangible, non-transitory computer-readable media storing computer-readable instructions that when executed by one or more processors cause the one or more processors to perform operations, the operations comprising:
obtaining data descriptive of a machine-learned decoder model, the decoder model having been trained by sequentially backpropagating a loss function through the decoder model to train the decoder model, and then through a channel model without modifying the channel model, and then through an encoder model to train the encoder model, the encoder model configured to receive a first set of inputs and output a first set of outputs, the channel model configured to receive the first set of outputs and output a second set of outputs, the decoder model configured to receive the second set of outputs and output a third set of outputs, the loss function descriptive of a difference between the first set of inputs and the third set of outputs, wherein the channel model used to train the decoder model is trained by:
sending a second set of inputs over a communication channel;
receiving a fourth set of outputs from the communication channel;
providing the second set of inputs to the channel model and receiving a fifth set of outputs from the channel model in response to receipt of the second set of inputs;
determining a second loss function between the fourth set of outputs and the fifth set of outputs; and
backpropagating the second loss function through the channel model while modifying the channel model to train the channel model;
obtaining a first set of communication data received from a communication channel;
inputting the first set of communication data into the machine-learned decoder model; and
receiving as an output of the machine-learned decoder model, in response to receipt of the first set of communication data, a decoded version of the communication data.

15. The one or more tangible, non-transitory computer-readable media of claim 14, wherein the machine-learned decoder model comprises a deep neural network.

16. The one or more tangible, non-transitory computer-readable media of claim 14, the decoder model having been further trained by:
receiving the fourth set of outputs and, in response to receipt of the fourth set of outputs, generating a sixth set of outputs;
determining a third loss function that describes a difference between the second set of inputs and the sixth set of outputs; and
backpropagating the third loss function through the decoder model while modifying the decoder model to train the decoder model.

17. The one or more tangible, non-transitory computer-readable media of claim 14, wherein:
backpropagating the loss function through the decoder model to train the decoder model comprises modifying at least one weight included in the decoder model; and
backpropagating the loss function through the encoder model to train the encoder model comprises modifying at least one weight included in the encoder model.

18. The one or more tangible, non-transitory computer-readable media of claim 14, wherein:
the encoder model is configured to receive the first set of inputs expressed according to a first set of dimensions;
the encoder model is configured to output the first set of outputs expressed according to a second set of dimensions in response to receipt of the first set of inputs; and
the decoder model is configured to output the third set of outputs expressed according to the first set of dimensions.

19. The computing device of claim 11, wherein:
the encoder model is configured to receive the first set of inputs expressed according to a first set of dimensions;
the encoder model is configured to output the first set of outputs expressed according to a second set of dimensions in response to receipt of the first set of inputs; and
the decoder model is configured to output the third set of outputs expressed according to the first set of dimensions.

20. The computing device of claim 11, wherein one or more of the channel model or the decoder model comprises a neural network.

* * * * *